(12) United States Patent
Ilieva et al.

(10) Patent No.: US 12,012,066 B2
(45) Date of Patent: Jun. 18, 2024

(54) PROXIMATE DEVICE DETECTION, MONITORING AND REPORTING

(71) Applicant: FORD GLOBAL TECHNOLOGIES, LLC, Dearborn, MI (US)

(72) Inventors: Elena Ilieva, Bloomfield Hills, MI (US); Simon John William Hurr, Grays (GB); Yamen Taleb, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 17/169,793

(22) Filed: Feb. 8, 2021

(65) Prior Publication Data

US 2022/0250582 A1 Aug. 11, 2022

(51) Int. Cl.
*B60R 25/01* (2013.01)
*G08B 13/22* (2006.01)
(Continued)

(52) U.S. Cl.
CPC .............. *B60R 25/01* (2013.01); *G08B 13/22* (2013.01); *G08B 25/001* (2013.01); *G08B 29/185* (2013.01); *B60R 2325/101* (2013.01)

(58) Field of Classification Search
CPC ....... H04W 4/80; H04W 4/029; H04W 84/18; H04W 12/04; H04W 12/02; H04W 12/75; H04W 4/02; H04W 4/025; H04W 4/06; H04W 4/70; H04W 64/00; H04W 8/005; H04W 12/06; H04W 12/10; H04W 12/61; H04W 12/63; H04W 12/67; H04W 12/79; H04W 76/11; H04W 12/084; H04W 48/10; H04W 4/021; H04W 8/205; H04L 67/18; H04L 43/10; H04L 63/06; H04L 63/08; H04L 63/0876; H04L 63/107; H04L 67/12; H04L 67/22; H04L 67/26; H04L 2209/56; H04L 2463/102; H04L 63/0853; H04L 63/126; H04L 67/104; H04L 67/1061; H04L 67/1072; H04L 67/1078; H04L 67/1095; H04L 67/306; H04L 9/3247; G01S 1/02; G01S 19/14; G01S 19/48; G01S 1/70; G01S 1/72; G06Q 20/3224; G06Q 30/02; G06Q 20/02; G06Q 20/04; G06Q 20/10; G06Q 20/12; G06Q 20/32; G06Q 20/322; G06Q 20/347; G06Q 20/382;
(Continued)

(56) References Cited

U.S. PATENT DOCUMENTS

7,471,192 B2    12/2008 Hara et al.
9,451,407 B2 *   9/2016 van der Laak ....... H04W 4/025
(Continued)

*Primary Examiner* — Daniel Previl
(74) *Attorney, Agent, or Firm* — Joseph Zane; Brooks Kushman P.C (57) ABSTRACT

A vehicle system receives a search request, such as from a remote server or other vehicle. The system, responsive to the search request, searches for one or more device signals using one or more sensors of the vehicle. Further, the system records any device signatures associated with any device signals detected by the search and transmits the device signatures to a remote server. The remote server may take further action, such as, but not limited to, alerting the authorities, disabling a vehicle or vehicle system, and/or notifying a vehicle owner, based on processing the received signatures.

18 Claims, 4 Drawing Sheets

(51) Int. Cl.
*G08B 25/00* (2006.01)
*G08B 29/18* (2006.01)

(58) Field of Classification Search
CPC ............... G06Q 20/385; G06Q 20/388; G06Q 20/4014; G06Q 20/425; G06Q 20/341; G06Q 20/4016; G06Q 20/405; G06Q 20/40975; G06Q 30/00; G06Q 30/0201; G06Q 30/0207; G06Q 40/04; G07F 7/10; G07F 7/1075; G07F 7/1008; G07F 7/1025; H04H 60/90; H04H 20/62; Y04S 40/20; B60R 2325/101; B60R 25/24; B60R 25/403
USPC ...... 340/426.11, 427, 426.12–426.18, 426.3, 340/438, 447, 539.22, 539.1, 571
See application file for complete search history.

(56) References Cited

U.S. PATENT DOCUMENTS

| | | |
|---|---|---|
| 10,015,654 B2 | 7/2018 | Ossin et al. |
| 10,112,579 B2 | 10/2018 | Sasaki |
| 10,640,084 B1 | 5/2020 | Conners |
| 10,647,300 B2* | 5/2020 | Shirazi .................... G08B 13/00 |
| 2010/0330908 A1* | 12/2010 | Maddern ............. H04M 1/6058 |
| | | 455/41.2 |
| 2013/0124009 A1* | 5/2013 | Esler .................... B60W 50/085 |
| | | 701/2 |
| 2013/0343431 A1* | 12/2013 | Yang ..................... H04W 8/005 |
| | | 375/134 |
| 2014/0362024 A1* | 12/2014 | Hicks .................. G06F 3/03545 |
| | | 345/174 |
| 2017/0013569 A1* | 1/2017 | Braxton ............. G08B 21/0263 |
| 2017/0041356 A1* | 2/2017 | Nelson .................... H04W 4/40 |
| 2017/0195958 A1* | 7/2017 | Korneluk ................ H04W 48/18 |
| 2018/0152592 A1* | 5/2018 | Sako ...................... H04W 8/005 |
| 2018/0184253 A1* | 6/2018 | De Lorenzo .......... H04W 4/029 |
| 2019/0287377 A1* | 9/2019 | Gillum .................... G01S 19/51 |
| 2019/0311061 A1* | 10/2019 | Peterson ............. G06F 16/2477 |
| 2020/0004559 A1* | 1/2020 | Cao ...................... G06F 9/44505 |
| 2020/0322095 A1* | 10/2020 | Park ...................... H04L 5/0094 |
| 2021/0160365 A1* | 5/2021 | Pearce .................... H04W 4/12 |
| 2021/0168496 A1* | 6/2021 | Hehn ...................... H04W 4/46 |

* cited by examiner

PROXIMATE DEVICE DETECTION, MONITORING AND REPORTING

TECHNICAL FIELD

The illustrative embodiments relate to methods and apparatuses for proximate device detection, monitoring and reporting.

BACKGROUND

Vehicles come equipped with a variety of sensors and cameras, that improve adaptive driving assistance systems (ADAS) and generally provide connectivity and a better driving experience. Typically, these sensors have an assigned purpose, such as cameras detecting other vehicles and BLUETOOTH sensors detecting occupant devices. These sensors are also frequently run at low power or disabled when not in use for their intended purposes.

Anti-theft devices have also improved over time, and necessarily so, as more and more digital and wireless access opportunities for a vehicle are provided. While these are convenient options, they also open the opportunity for a skilled hacker to digitally access a vehicle, and original equipment manufacturers (OEM)s are ever on the guard against such attacks, realizing this to be a vulnerability of such systems.

SUMMARY

In a first illustrative embodiment, a vehicle system includes a processor of a vehicle configured to receive a search request. The processor is also configured to, responsive to the search request, search for one or more device signals using one or more sensors of the vehicle. Further, the processor is configured to record any device signatures associated with any device signals detected by the search and transmit the device signatures to a remote server.

In a second illustrative embodiment, a computer-implemented method includes receiving a search request. The method also includes, responsive to the search request, searching for one or more device signals using one or more sensors of the vehicle. Further, the method includes recording any device signatures associated with any device signals detected by the search and transmitting the device signatures to a remote server.

In a third illustrative embodiment, a system includes a processor configured to receive a list of detected device signatures from a vehicle. The processor is also configured to compare the received signatures to a pre-saved list of signatures associated with the vehicle and, responsive to the comparing resulting in a match, notify at least one device associated with the vehicle and not included in the list of device signatures, of a vehicle access attempt.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While vehicle sensing and communication systems, e.g., without limitation, cameras, BLUETOOTH (BT and/or BLE), Wi-Fi, etc., typically have defined primary purposes, there is an opportunity to leverage these systems for other uses. They can be activated by a vehicle even when the vehicle is itself keyed-off, and the detection and recording capability of and associated with such systems can be used, for example, in theft prevention and thief apprehension.

The illustrative embodiments propose the use of vehicle sensors, including, for example, BT or BLE sensors, to detect wireless device signatures when an alert state exists. This can be a state triggered by an alarm system, or a state explicitly requested by another system. BLE sensors, which may be provided to detect occupant phones and devices, may also detect devices in close proximity to a vehicle. Any detected devices can be stored, along with device identifying information, which can then be used to both verify an access attempt, detect and identify an intruder, and track the travel of a device, among other things. Further, the presence of devices belonging to known offenders can be detected and noted, which can aid in a decision to contact authorities if desired, leading to a more effective security system for a vehicle, and a significant theft deterrent.

Vehicles can also work in conjunction with each other, the cloud and/or authorities to track or locate devices of suspected offenders, which can aid in identifying someone who attempted to improperly access a vehicle and even aid in apprehension. This can allow a network of vehicles to serve as theft deterrent and help discourage attempts at theft if thieves realize that they cannot simply run away to escape apprehension. Other vehicle sensors (object detection for detecting crouching people or the presence of a person, cameras for detecting and recording people, etc.) may also be leveraged on-demand when a situation dictates detection and/or recording.

Figure 1:
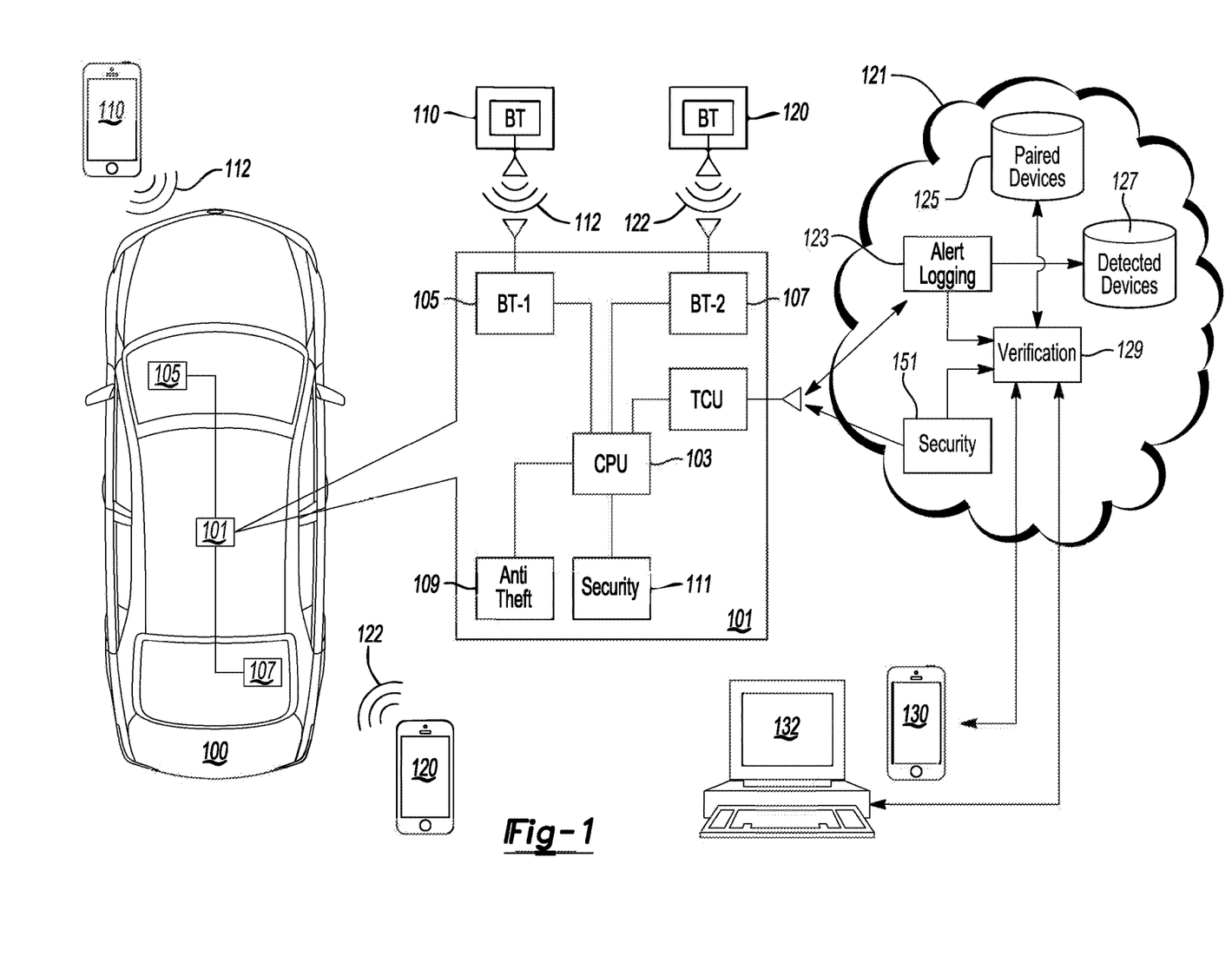
FIG. 1 shows an illustrative example of a vehicle and alert processing system.

FIG. 1 shows an illustrative example of a vehicle and alert processing system. In this illustrative example, the vehicle 100 includes an onboard computing system 101, which includes, for example, various electronic control units (ECUs) and sensors connected wirelessly or through a controller area network (CAN) bus. That is, even elements such as sensors 105 and 109 can be considered part of the computing system arrangement, even though they are shown at illustrative deployment locations in the vehicle 100 outside the system 101.

The system 101 may include, for example, one or more processors 103. These processors 103 may be connected to or in communication with a plurality of BLUETOOTH or BLUETOOTH Low Energy (BLE) transceivers 105, 107, two of which are shown for illustrative purposes, but more or fewer of which may be deployed at various locations within a vehicle 100 configuration. Having a relatively short range relative to other wireless technology such as Cellular or Wi-Fi, the BLE transceivers 105, 107 can nonetheless detect wireless devices 110, 120 that are nearby, but external to, a vehicle 100. These devices 110, 120 may broadcast BLE signatures 112, 122 that are detectable by the BLE transceivers 105, 107 and which can be stored in a system 101 memory.

The computing system may also have a variety of processes or ECUs that execute processes provided thereto. In this example, this includes an alarm ECU or module 109 and a security process and/or module 111. The alarm may be triggered by a variety of vehicle-detected conditions and state-changes and the security process may enact the illustrative embodiments, or the like, in response to an alarm state indicated by the alarm system 109. This can include, for example, detection of local BLE signatures 112, 122, storage of those signatures 112, 122, analysis of those signatures 112, 122, and transmission of those signatures 112, 122 to the cloud 121.

The cloud 121 or other backend system, remote from the vehicle 100, may include, for example, an alert logging process 123, which receives the alert messages from the vehicle 100 and stores the relevant data in various databases 127, as well as passes the data to other processes for handling and owner/authority alerts.

In this example, the alert logging process 123 saves a copy of all detected devices reported by a vehicle 100 into a database 127. If the alert state is later cancelled or determined to be a false alarm, this information can be deleted as needed. The process 123 then passes the detected device information along to a verification process 129.

The verification process 129 accesses a database 125 of known stored devices, which can include, for example, all devices having been verified as paired with a given vehicle 100. In this manner, the system can verify whether any known devices are even present within proximity to the vehicle 100 in which the alarm was triggered.

Since devices may be usable as keys, and since the presence of a device is no guarantee of a false alarm, detecting the presence of a known device may not be the last step undertaken by the process 129. For example, the process 129 may contact a registered owner device 130, 132 with an alert and/or a request to either cancel the alarm or disable the vehicle 100. If the owner device 130 was included in the list of detected devices, the alert may be sent to a different device, since a thief may be in possession of the owner device and have used that device 130 to improperly access the vehicle 100.

Of course, the owner of the device 130 may have inadvertently set off the alarm as well, so whether to send the message to the owner device when it is detected at the vehicle 100 in conjunction with an alarm state is a matter of preference, weighing the nuisance to the owner if the owner cannot use the device to cancel an inadvertent alarm vs. the risk of allowing a thief in possession of the owner device 130 to cancel the alarm. One possible example of how to handle this would be to send the cancellation message to both device 130 and 132, but provide a disable vehicle option with the message to the non-present device 132, so the owner, if not present at the vehicle 100, could disable the vehicle 100 even if the thief, in possession of the owner device 130, cancelled the alarm.

A security process 131 can receive messages from the owner and verification process 129 and send alarm cancellation requests, vehicle disable requests and BLE signature tracking requests to the vehicle 100 and other vehicles. This process may also work in conjunction with authorities to track a suspected thief BLE device using a plurality of vehicles as will later be described herein.

Several illustrative examples of how such a system may be used will be described with respect to the illustrative embodiments below, for example purposes. This can include, for example, tracking and logging BLE signatures when an alarm is set off, to possibly record the signature of a device possessed by a vehicle thief, track the progress of the thief as the thief flees the vehicle 100, and allowing for cancellation of the alarm state and/or remote disabling of the vehicle 100 responsive to an alert. As vehicles 100 can be activated as BLE detection and logging devices, authorities could also use such vehicles 100 to track down a device in possession of a known offender, who may be in a defined area where such vehicles 100 are present.

Figure 2:
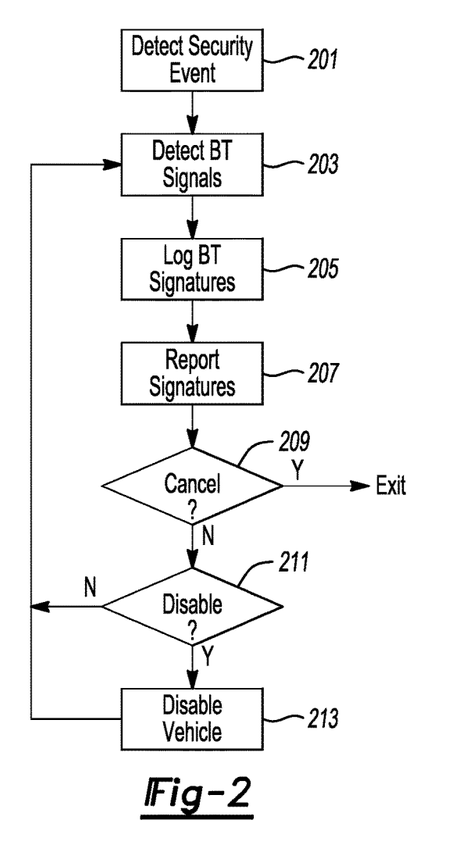
FIG. 2 shows an illustrative vehicle-side process for alert handling.

FIG. 2 shows an illustrative vehicle-side process for alert handling. This process can be executed fully or partially on the vehicle 100, or on the vehicle 100 working in conjunction with a remote system 121. The process, such as security process 111, may detect a security event generated by alarm process 109 or other security event designated to trigger the security process 111. Typically, this will be activated in a powered-off vehicle 100, or in a vehicle 100 that has just been powered in response to some form of key-on request or other power initiation instruction.

Because there is a security alert, the process 111 will engage BT or BLE sensors 105, 107 to detect signals in proximity to a vehicle 100. If the range of BT sensors is too high, then BLE sensors may be used, to avoid detecting too many devices, such as those in a crowded parking lot. On the other hand, if there is an attempt to track a known device, as described later herein, BT sensors may also be used, which may have a longer range and be more effective for tracking a device.

The process 111 detects BT signals from various local devices 110, 120 that are in a communication proximity to the vehicle 100. Various distancing techniques, such as received signal strength indicator (RSSI) may be used to determine whether a device 110 is too far to be logged, or all detected devices 110, 120 may be initially logged at 120.

There are a variety of reasons why alarms are falsely engaged, and many people frequently notice alarm engagement when no theft is in process. Accordingly, in this example, the process 111 provides an opportunity to cancel the alarm with no further actions being taken with regards to disabling the vehicle 100 or alerting authorities. This, in this example, can be achieved by sending the reported signatures to the cloud 121 for verification at 207.

If a remote process, such as security process 131 in the cloud 121 responds with instructions to cancel the alert state at 209, the process 111 can cancel the alert, stop the alarm, and delete locally stored BT or BLE profiles. On the other hand, if the security process 131 instructs disabling of the vehicle at 211, the process 111 can disable the vehicle 100 and leave the alarm state on, as well as continuing to detect and log BLE and BT signatures until such time as an authorized user cancels the state at 109 and/or enables the vehicle 100.

For example, in a first instance a first user may be missing the user's device, and may use a second user's device to access the vehicle 100. If there is a security measure missing from the access request, this may result in an alarm state (e.g., the first user cannot verify a biometric or other security measure on the second user's device). This may also result in a message to a primary owner, who may know of the attempted use and approve of the use, and who can cancel the alarm state and verify the attempted use. The remote verification process 129 will also recognize the device and may, under owner instructions, approve this previously paired device for temporary access use with no further security implications.

In a second example, a user's device may have been stolen by a thief, and the thief may encounter a similar issue to that above when attempting to use the device to start the vehicle 100. The message may be sent to the primary owner, on at least one device other than a device detected at the vehicle 100. This can be a device identified as a secondary device, a primary device and/or a computer or other secondary account. The message may be sent to the detected device as well, although the option to cancel the alarm, for example, may be the only option (as opposed to disable the vehicle 100) and/or there may not be an option and it may simply be an alert. Even though, in this example, the thief would be notified via the stolen device, that alone may serve as an additional deterrent and may cause the thief to leave. If the system is designed to lure the thief into capture, the thief may even be able to cancel the alarm via the owner device present at the vehicle 100, which could create a false sense of security, and then if another authorized user selected "alert authorities" or "disable vehicle," there may be a better chance of catching the thief, although most users would probably just prefer the thief left the vehicle 100 entirely and ran away.

The message at a secondary device or secondary account (or primary device not at the vehicle) may include an option to disable the vehicle 100 remotely and may further identify one or more devices detected at the vehicle 100. So, if an owner knows their phone is missing, and sees the phone as being at the vehicle 100, the owner may elect to disable the vehicle 100 since there is likely someone trying to use the device to steal the vehicle 100.

Figure 3:
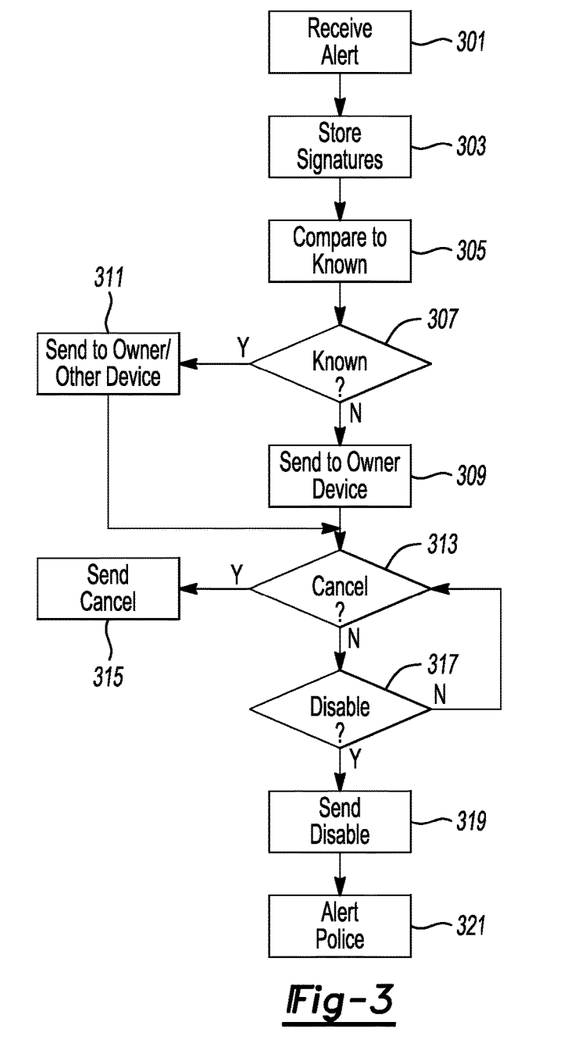
FIG. 3 shows an illustrative cloud-side process for alert handling.

FIG. 3 shows an illustrative cloud-side process for alert handling. In this example, the process 123 receives an alert at 301 from the vehicle 100, indicating that there is an alarm state. This message can come from the alarm system 109 or the security process 111. Included in the message are the detected signatures of any devices 120, 130 detected in proximity to the vehicle 100 when the alarm state was triggered. Any additional captured information (e.g., camera feeds, etc.) may also be included or may be captured and/or included at a later date if and when the alarm is not cancelled or disablement is requested.

The process 123 extracts the device signatures from the alert message, which the process can save at 303. These can be stored longer term or deleted upon alarm cancellation, depending on a need to preserve the signatures. The process 123 stores these signatures to a detected devices database 127 and then may pass control to a verification process 129.

The verification process can check the signatures against known, previously paired devices at 305, stored in database 125. These can include several instances of signatures, including authorized and paired users and known thief devices, the use of which will be described later herein. If the device is known as an authorized device at 309, the process 129 may send an alert to either the primary device (if that device is not present at the vehicle 100) and/or to another device that is not present at the vehicle 100, at 311. If the device is not known (if none of the devices are known), the process 129 may send the message to a primary device at 309 and/or any other devices designated for reporting. The message may include one or more options to, for example, cancel an alarm, disable a vehicle, contact the authorities, etc. Messages to devices at the vehicle 100 may lack certain of these options, based on developer preferences and as previously noted.

If any one of the devices receiving the message requests a cancellation of the alarm at 313, sending a message back to the cloud 121, the process 131 can send an instruction to the vehicle 100 to cancel the alarm at 315. If any of the devices requests disablement of the vehicle 100 (which may also require an authorization code or secondary verification), the process 131 may send a disablement code to the vehicle 100, instructing disabling or limiting of vehicle 100 functionality. In this example, the process 131 also alerts the authorities at 321, although that could be a secondary option or only activated under certain circumstances, to avoid false dispatch.

Figures 4, 5:
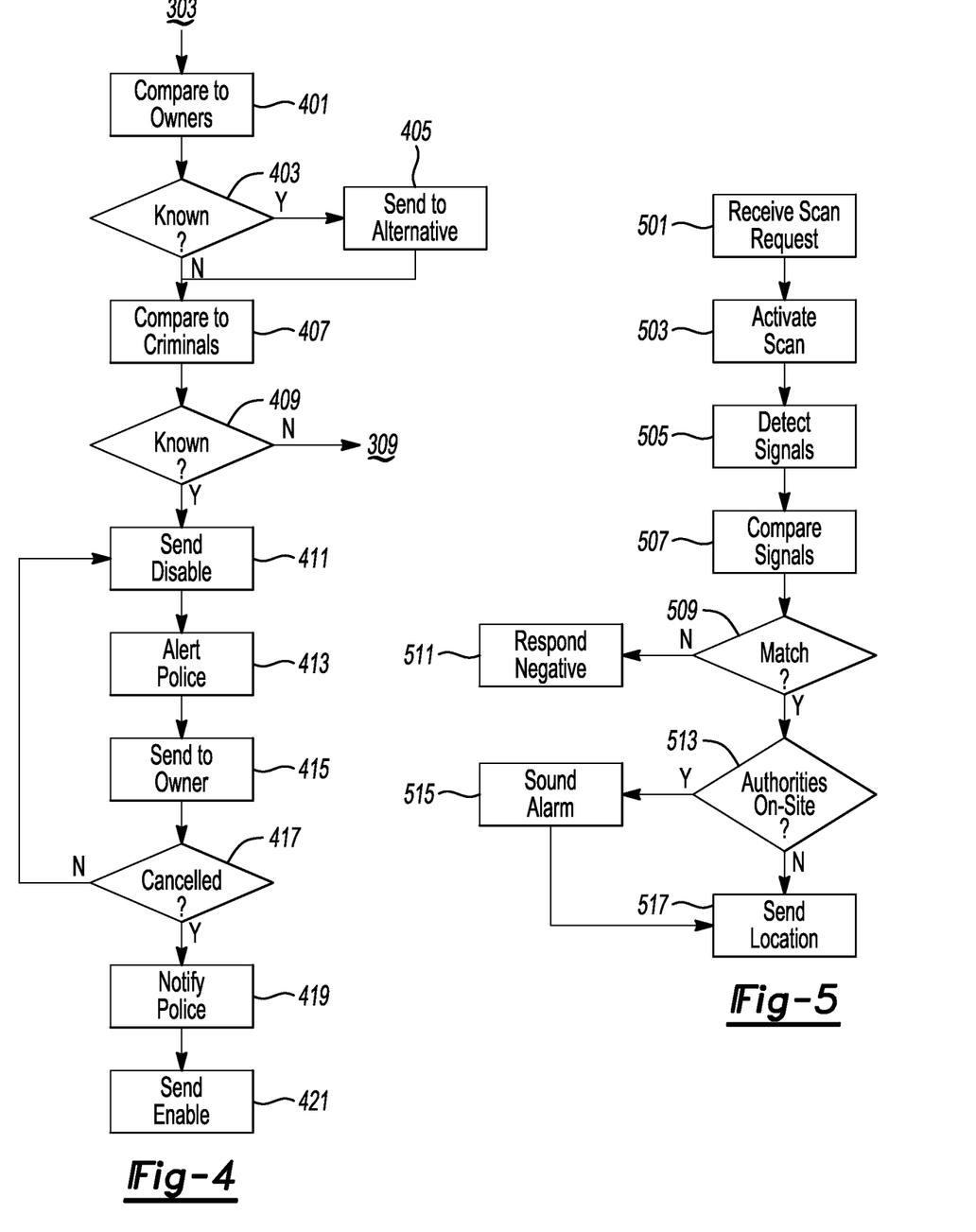
FIG. 4 shows an additional illustrative cloud-side process for alert handling.
FIG. 5 shows an illustrative device tracking process.

FIG. 4 shows an additional illustrative cloud-side process for alert handling. This process includes an element for identifying known thieves, which may be useful for alerting the authorities and/or disabling the vehicle 100. Of course, this only works if the thief does not know that there is a record of the device, however under limited circumstances this may be a useful process. Devices of suspected thieves may be stored as well, such as devices repeatedly present at vehicles with activated alarm states, when the device is not authorized for such a vehicle. While it is possible that such a device simply happens to be in proximity to multiple vehicles, the likelihood of the same device randomly being at more than a couple of vehicles whose alarm states are activated is very low, especially if the occurrences are within a relatively small window of time.

In this example, the process 129 first performs the comparison of device signatures to the owner's devices at 401 as before, to determine if an owner device is present. If there is a known device present at 403, the process 129 sends the message to an alternative device at 405. Then, in this example, the process 129 compares the list of signatures to a list of known or suspected criminal devices at 407 or other device of secondary interest. In another example, tow truck drivers and other authorized people who may set off an alarm may also have stored device IDs, so if, for example, towing triggered the alarm, the alarm could be cancelled if a tow truck driver or authority (e.g., police) device was present.

If there is a match to a known or suspected offender device at 409, the process 131 may send a disable code 411, or an alert indicating a disablement will occur if an authorization or override code is not input within a certain time period. Also, in this example (or when an override code is not input), the process 131 may alert the authorities at 413. And, the process 129 may also send a message to an owner device 140, 142, alerting the owner of what is occurring. The owner may be in a location or position to mitigate any potential loss if they are proximate to their vehicle's location. This can also give the owner a chance to cancel the message, authority alert and disablement.

Since ex-criminals own vehicles 100 and it would not be fair to accuse someone of stealing their own vehicle 100, the cancellation option to the owner device (or other device not present) can help prevent false positives. Or if a careless owner who frequently sets off their own alarm happens to be friends with an ex criminal, OEMs would not want to create a false positive for theft when it was not occurring. In the former event, the match of the ex-criminal's device as an owner device should prevent the alert, and in the latter case the owner (who would presumably be present) can cancel the alert. Also, depending on the desire to avoid false dispatch and false disablement, the owner may be contacted first, prior to dispatch of the authorities. If time is of the essence, however, the authorities may be contacted when the owner is sent the message and a fast cancellation can allow the dispatch to be cancelled. The authorities may also be provided with a contact number to call the owner as well, which can allow them to alert the owner in person and verify the theft.

In this example, since disablement, authority alert and owner alert happened at the same time, if the owner cancels the alarm the process 131 may notify the authorities of the false alarm at 419 and send an enablement message to the vehicle at 421. While it is important to avoid false dispatch, areas plagued with vehicle theft may also have an increased interest in apprehension and may allow the simultaneous dispatch even if it results in some cancelled calls. In other areas, law may prohibit dispatch until the owner has been notified with a chance to cancel the event. It is also possible to use the backend to send a public safety access point (e.g., 911) connection to the mobile device 140, so the owner can establish immediate communication with the PSAP operator to verify the theft and to be told, for example, not to interfere as the authorities are en route.

FIG. 5 shows an illustrative device tracking process. In this example, vehicles are used as a tracking network that can aid in finding thieves and other parties with known devices (e.g., Amber alert, when a child is taken by a parent with a known phone number, whose device signature can be obtained from the phone company).

In this example, the process executing on a vehicle (and possibly working in conjunction with a cloud-based coordination process 131) receives a request for a scan at 501. This can be used, for example, by authorities to track down a known suspect in a given location (e.g., a block or even an entire city). The vehicles responding to the request activate a scan at 503, looking for an identified device signature provided with the request.

The vehicle detects and proximate signatures at 505 and compares them to the sought-after device at 507. If there is no match, the process may terminate at 511, or terminate after several attempts with no match. If the request is over a large geographic area, most vehicles will not find a match, and so they may terminate quickly so as not to overtax vehicle resources such as power.

If there is a match at 509, the vehicle 100 determines if the authorities are on-site. For example, this request could have been sent immediately after a crime of any nature, where the authorities are already on-site, or the authorities may be on-site because they have responded to a previous vehicle's report.

If the authorities are on-site and proximate within earshot of the detecting vehicle, the process may sound a vehicle alarm at 515, which may aid in directing the authorities in the correct direction. Sequential alerts and alarms may allow the authorities to track the thief, even if they cannot see the thief. In either instance (whether or not the authorities are on-site), the vehicle 100 may report its location to the cloud and/or authorities at 517.

This process can be used to track devices of attempted thieves if they flee the scene of an attempted vehicle theft or crime. This process can execute on the cloud as the security process 131 and leverages a network of vehicles to track the thief. As long as the thief remains in detectable proximity to one or more vehicles in the network, the vehicles can continue to track the thief's location. Requests can also be sent over an ad-hoc vehicle to vehicle (V2V) network, but that tracking request may be more limited if there is a gap in the network.

The cloud 131 process can determine the site of an initial alarm or initial request (indicating a known or likely location) and use reported vehicle locations to determine other vehicles in proximity to the request. The process may also send out a general broadcast with geographic parameters that can be ignored by any vehicles not within the defined coordinates, if exact vehicle locations are not known. The request may also be ignored by any traveling vehicles, so as not to involve occupied vehicles in the process of thief-tracking.

Figure 6:
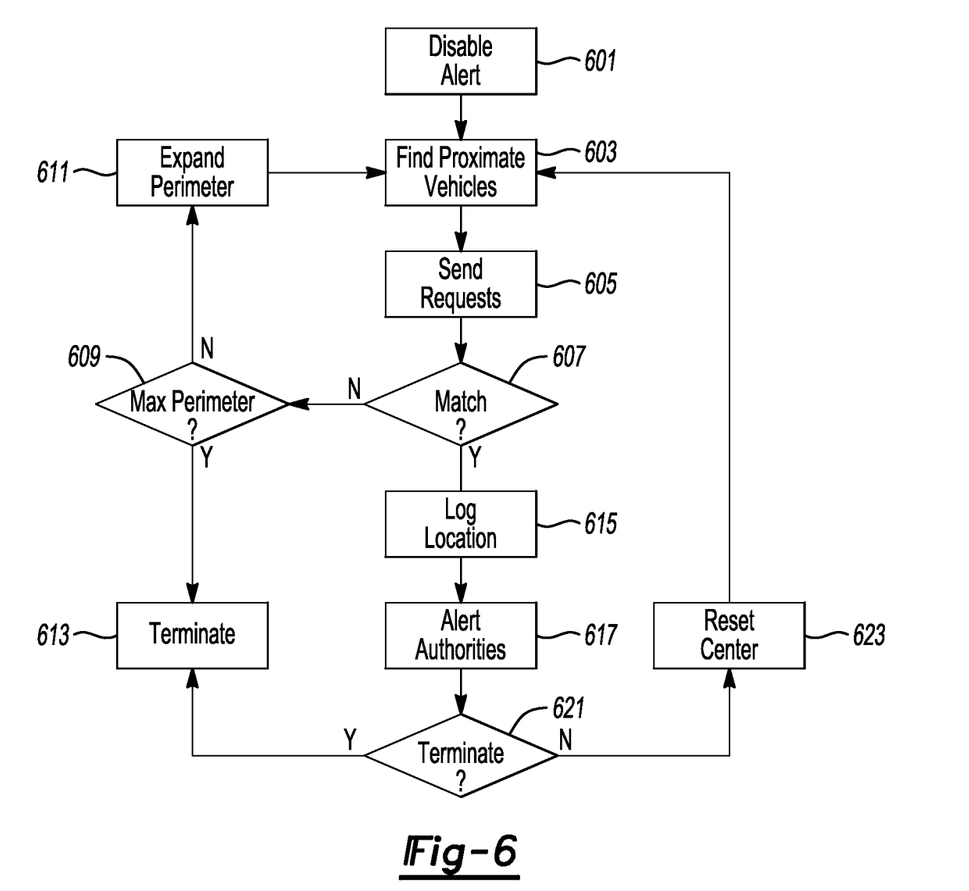
FIG. 6 shows an additional illustrative device tracking process.

FIG. 6 shows an additional illustrative device tracking process. In this example, the security process receives instructions to disable a vehicle at 601, which is potential confirmation of an attempted theft. The cloud may again use reported vehicle locations at 603 or send a geo-fenced request at 605 to many vehicles, and those not within the coordinate set can ignore the request. The request may also include the signatures of devices present at the vehicle 100 when the original alarm that resulted in the disablement request was detected.

A vehicle receives a request to activate a scan at 607 and detects all local BLE signatures or BT signatures. In this example, if desired, BT signatures may be used if they have a greater detection range, since the goal is to look for a single device (or several devices) and not all devices in a detectable range. Any vehicle detecting a matching signature may report back to the cloud with their locations.

If the cloud receives no matching reports at 607, the process 131 may expand the perimeter of the request at 611, provided a maximum perimeter has not been met at 609, in case the thief is still in the area but outside the original request (e.g., on a bicycle, having traveled further than expected if the thief had been on foot). The request and expansion process may continue until there is a positive result (rendering most of the other requests extraneous at that moment). The process 131 may also terminate all requests at 613 if the maximum perimeter has been reached, to preserve vehicle power.

Once a match has been reported at 615, the process 131 may log the location reported at 615 and deliver an alert to the authorities at 617, who may or may not have been contacted already. The process 131 may also instruct alarm activation from the detecting vehicle 100, if the authorities are in a position to benefit from such an activation (e.g., on-site or en route and near to where the detection occurred).

If there is not a termination request from the owner or authorities at 621, the process 131 may reset a fence or strategy using the detected location as the new center, and repeat tracking, while also disabling tracking on vehicles who are outside the new perimeter. In this manner, a different group of vehicles can assist in tracking the thief as the thief moves away from the original vehicle 100.

A series of activated alarms can serve to lead the authorities in the correct direction of the thief, who will either have to seek cover or continue to flee. The vehicle or vehicles detecting the device may also send their own locations so the authorities and cloud-process have a breadcrumb trail to follow as the vehicles track the thief.

For example, if a thief attempted a robbery in a mall parking lot, where there are numerous vehicles, the thief may run a short distance away and attempt to hide. The initial vehicle could report the alarm and the thief's signature could be sent to every vehicle in the parking lot with detection capability. As long as the thief did not take shelter out of range of such a vehicle, the vehicles could continue to track the thief and audibly and/or silently report the thief's presence near a given vehicle.

In another example, the thief may attempt to steal a vehicle on a lonely street, with no other vehicles. Fleeing the scene, the cloud could send out a message to vehicles within a reasonable radius that could be reached on foot from the initial scene within a given time period. If the thief was detected at a given location, the process 131 could recalibrate and resend the signal, which can result in vehicles perpetually tracking the thief as long as the thief does not hide or travel out of the range of any vehicle's detection capabilities. This may greatly aid in the apprehension of the thief, and can be an automatically activated process when certain conditions are met (e.g., device and alarm detected, owner suspects theft so sends disable signal, the thief can no longer steal the vehicle so is forced to flee on foot).

Using the illustrative embodiments and the like, improved security detection and reporting can occur onsite at an alarm-activated vehicle, wherein the vehicle may use a non-obvious signature the thief may not even know that is present to log the presence of the thief. This can also result in opportunities to alert the authorities, disable the vehicle, avoid false positives and generally leverage the vehicle sensors and a back-end to improve overall security. Vehicles can even aid in the tracking and location of a suspect or other device of interest if desired.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle system comprising:
   a processor of a vehicle configured to:
   receive a search request, including a mobile device signature;
   responsive to the search request, search for one or more mobile device signals using one or more sensors of the vehicle;
   determine if any mobile device signatures associated with any device signals detected by the search correspond to the included mobile device signature; and
   notify an entity associated with the search request of the discovery of the mobile device signature.

2. The system of claim 1, wherein the sensor is a Bluetooth sensor.

3. The system of claim 1, wherein the sensor is a Bluetooth low energy sensor.

4. The system of claim 1, wherein the processor is further configured to repeat the search, recordation and transmission at intervals until the processor receives a cancel command.

5. The system of claim 1, wherein the processor is further configured to:
responsive to at least one of the device signatures matching the requested device signature, sound a vehicle alarm.

6. The system of claim 1, wherein the processor is configured to:
responsive to at least one of the device signatures matching the requested device signature, report a vehicle location.

7. The system of claim 1, wherein the mobile device signature is received in a search request from another vehicle.

8. A computer-implemented method comprising:
receiving a search request, including a mobile device signature;
responsive to the search request, searching for one or more mobile device signals using one or more sensors of the vehicle;
determining if any mobile device signatures associated with any device signals detected by the search correspond to the included mobile device signature; and
transmitting confirmation of the detection of the requested mobile device signature to a remote server.

9. The method of claim 8, wherein the sensor is a Bluetooth sensor or a Bluetooth low energy sensor.

10. The method of claim 8, further comprising repeating the searching, recording and transmitting at intervals until the processor receives a cancel command.

11. The method of claim 8, further comprising:
responsive to at least one of the device signatures matching the requested device signature, sounding a vehicle alarm.

12. The method of claim 8, further comprising:
receiving at least one requested device signature in a search request from the remote server; and
responsive to at least one of the device signatures matching the requested device signature, report a vehicle location.

13. The method of claim 8, wherein the mobile device signature is received in a search request from another vehicle.

14. A system comprising:
a processor configured to:
receive a list of detected device signatures from a vehicle;
compare the received signatures to a pre-saved list of signatures associated with the vehicle; and
responsive to the comparing resulting in a match, notify at least one device associated with the vehicle and not included in the list of device signatures, of a vehicle access attempt.

15. The system of claim 14, wherein the system is configured to:
receive a response to the notification indicating vehicle shut-down; and
instruct the vehicle to disable one or more vehicle functions.

16. The system of claim 15, wherein the vehicle functions include vehicle ignition.

17. The system of claim 14, wherein the processor is further configured to:
compare the received signatures to a pre-saved list of devices associated with known offenders; and
responsive to the comparing resulting in a match, send a vehicle disable instruction to the vehicle.

18. The system of claim 14, wherein the processor is further configured to:
compare the received signatures to a pre-saved list of devices associated with known offenders; and
responsive to the comparing resulting in a match, send a notification to authorities.

* * * * *